(12) United States Patent
Washiro

(10) Patent No.: US 10,164,718 B2
(45) Date of Patent: Dec. 25, 2018

(54) TRANSMISSION APPARATUS, TRANSMISSION METHOD, AND TRANSMISSION SYSTEM

(71) Applicant: eNFC Inc., Minato-ku, Tokyo (JP)

(72) Inventor: Takanori Washiro, Tokyo (JP)

(73) Assignee: eNFC Inc., Minato-ku, Tokyo (JP)

( * ) Notice: Subject to any disclaimer, the term of this patent is extended or adjusted under 35 U.S.C. 154(b) by 0 days.

(21) Appl. No.: 15/765,028

(22) PCT Filed: Jun. 22, 2016

(86) PCT No.: PCT/JP2016/003015
§ 371 (c)(1),
(2) Date: Mar. 30, 2018

(87) PCT Pub. No.: WO2017/077664
PCT Pub. Date: May 11, 2017

(65) Prior Publication Data
US 2018/0287716 A1    Oct. 4, 2018

(30) Foreign Application Priority Data
Nov. 2, 2015    (JP) ................. 2015-216057

(51) Int. Cl.
*H04B 5/00* (2006.01)
*H04B 1/00* (2006.01)
(Continued)

(52) U.S. Cl.
CPC ............. *H04B 13/005* (2013.01); *H04B 5/02* (2013.01)

(58) Field of Classification Search
CPC ... H04B 1/04; H04B 1/40; H04B 1/48; H04B 13/00; H04B 17/12
(Continued)

(56) References Cited

U.S. PATENT DOCUMENTS 8,058,998 B2 * 11/2011  Burnside .............. H01Q 1/2216
340/10.1
8,294,538 B2 * 10/2012  Ueda ....................... H01P 1/203
333/236
(Continued)

FOREIGN PATENT DOCUMENTS

JP    2003088005 A    3/2003
JP    2006324774 A    11/2006
(Continued)

OTHER PUBLICATIONS

Jul. 19, 2016, International Search Report issued in the International Patent Application No. PCT/JP2016/003015.
(Continued)

*Primary Examiner* — Quochien B Vuong
(74) *Attorney, Agent, or Firm* — Kenja IP Law PC

(57) ABSTRACT

A transmission apparatus (10) includes a communication device (30), comprising two input/output terminals (20*a*, 20*b*), and a terminal line (40) connected to the first input/output terminal (20*a*) and having an electrical length of substantially 90°. By the second input/output terminal (20*b*) electrically coupling with a transmission medium (50) comprising a conductor or a dielectric, a high frequency signal or electric power is transmitted to another transmission apparatus coupled electrically to the transmission medium (50).

5 Claims, 10 Drawing Sheets

(51) Int. Cl.
*H04B 13/00* (2006.01)
*H04B 5/02* (2006.01)

(58) Field of Classification Search
USPC .................. 455/41.1, 41.2, 41.3, 63.1, 67.13
See application file for complete search history.

(56) References Cited

U.S. PATENT DOCUMENTS

| | | | | |
|---|---|---|---|---|
| 8,693,555 | B2* | 4/2014 | Matsumoto | H04B 3/548 |
| | | | | 375/257 |
| 8,994,470 | B2* | 3/2015 | Sakai | H05K 1/0225 |
| | | | | 333/12 |

FOREIGN PATENT DOCUMENTS

| | | | |
|---|---|---|---|
| JP | 2007089131 | A | 4/2007 |
| JP | 2009296551 | A | 12/2009 |
| JP | 2013141314 | A | 7/2013 |
| JP | 2013205361 | A | 10/2013 |

OTHER PUBLICATIONS

May 8, 2018, International Preliminary Report on Patentability issued in the International Patent Application No. PCT/JP2016/003015.

* cited by examiner

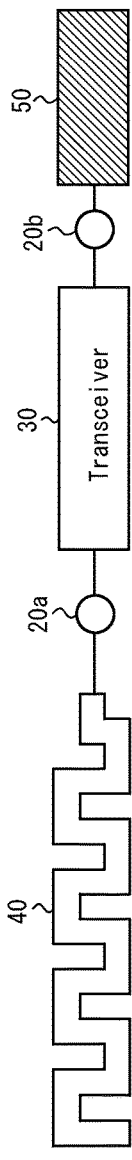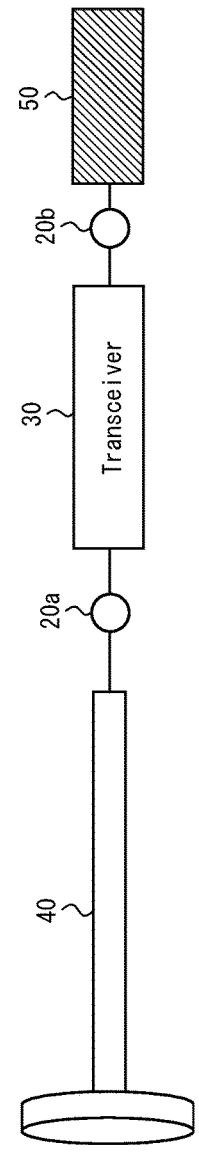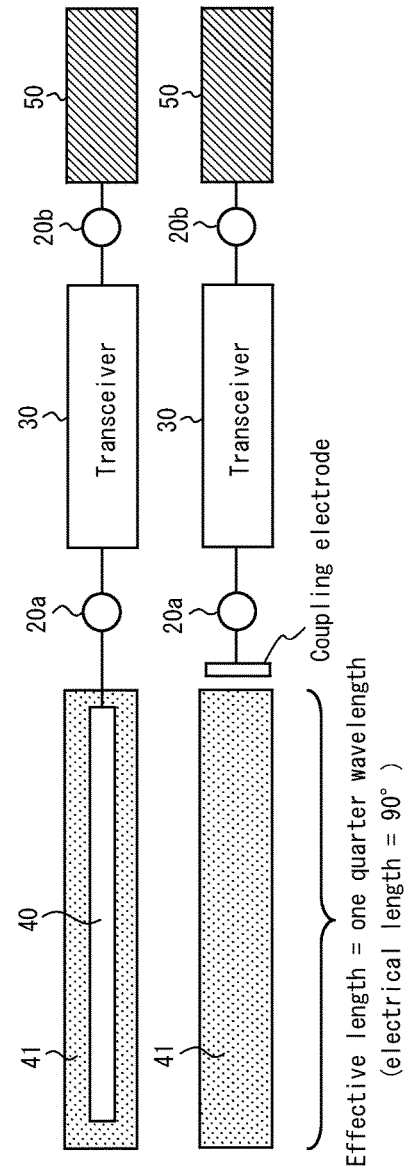

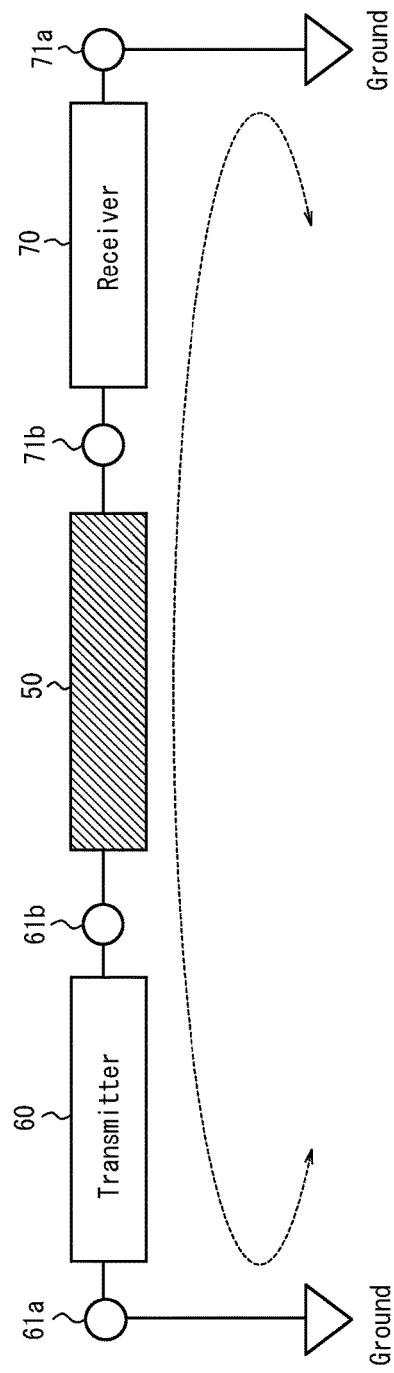

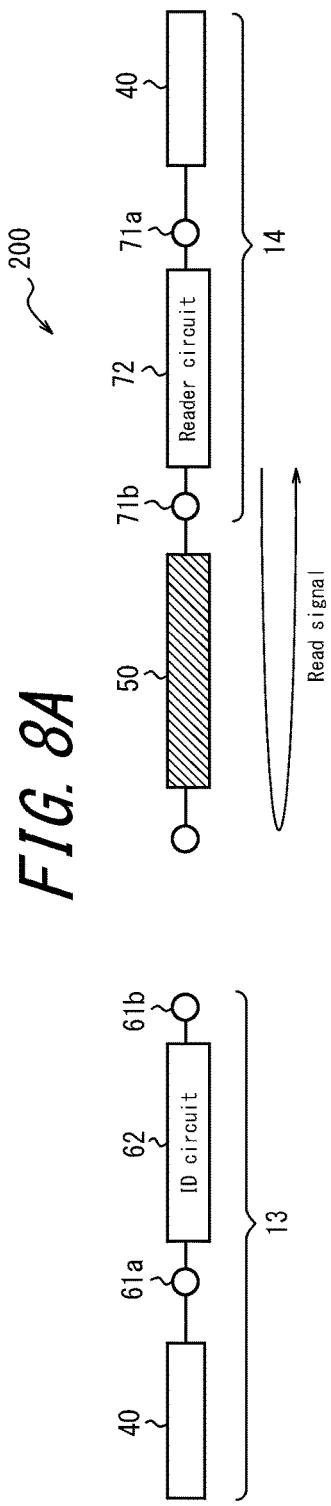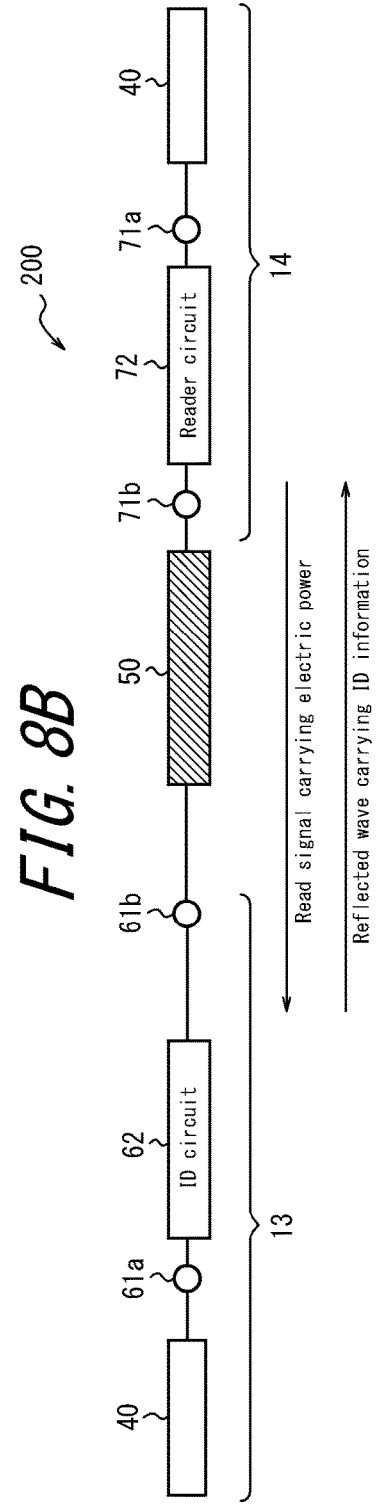

TRANSMISSION APPARATUS, TRANSMISSION METHOD, AND TRANSMISSION SYSTEM

CROSS-REFERENCE TO RELATED APPLICATION

The present application claims priority to and the benefit of Japanese Patent Application No. 2015-216057 filed Nov. 2, 2015, the entire contents of which are incorporated herein by reference.

TECHNICAL FIELD

The present disclosure relates to a transmission apparatus, a transmission method, and a transmission system that transmit a high frequency signal or high frequency electric power through a transmission medium formed by a conductor or a dielectric.

BACKGROUND

Since wireless communication has no physical line connecting a transmitter to a receiver, it is difficult to understand intuitively which devices are connected. The procedure for setting up a connection is also complex. Wired communication, on the other hand, uses a visible signal transmission path, allowing an intuitive operation to connect devices with a cable. However, wired communication has the disadvantages of a confusing layout as more cables are laid and of the continuous need to disconnect and reconnect cables when multiple devices communicate with each other.

To address these issues, methods have been proposed to capitalize on the advantages of wired communication, which allows clear selection of a communication partner through physical contact, while allowing communication without laying new cables. These methods overlay high frequency signals on existing transmission lines, so that when devices are separated, communication is not performed, whereas when another device is touching, communication is performed with the other device.

For example, methods have been proposed for communication between devices connected to a transmission line network by overlaying high frequency signals on existing transmission lines and for communication between devices in contact with a human body by overlaying high frequency signals on the human body, using the human body as a communication medium (for example, see patent literature (PTL) 1 and PTL 2).

CITATION LIST

Patent literature

PTL 1: JP 2013-141314 A
PTL 2: JP 2006-324774 A

SUMMARY

Technical Problem

With known techniques to transmit high frequency signals or high frequency electric power as a differential signal or a single ended signal, transceivers need to be connected to two transmission lines to form a closed circuit.

When a transmitter of a high frequency signal or electric power is connected to an existing transmission line and a high frequency signal or electric power is overlaid on the transmission line to transmit the high frequency signal or electric power to a receiver connected to a transmission path, the transmitter and receiver need to be connected by two transmission lines to form a closed circuit between the transmitter and the receiver. This leads to the problem of an increased number of cables.

Furthermore, in the communication technique using a human body as a communication medium, a first communication path using the human body as a communication medium and a second communication path for coupling through space need to be provided as a closed circuit between the transmitter and the receiver. However, when coupling the transceivers electrically through the space, the transmission efficiency is low and unstable, making it difficult to achieve stable communication because of the effect of the external environment, such as nearby metal or the imposition of electromagnetic noise.

In light of these considerations, it would be helpful to provide a transmission apparatus, a transmission method, and a transmission system that, with a simple configuration, are not easily affected by the external environment.

Solution to Problem

To this end, a transmission apparatus according to a first aspect comprises:
a communication device comprising two input/output terminals; and
a terminal line, connected to a first input/output terminal, having an electrical length of substantially 90°;
wherein by a second input/output terminal electrically coupling with a transmission medium comprising a conductor or a dielectric, a high frequency signal or electric power is transmitted to another transmission apparatus coupled electrically to the transmission medium.

In a transmission apparatus according to a second aspect, the second input/output terminal connects to a coupling electrode and couples electrically to the transmission medium by capacitance formed between the coupling electrode and a surface of the transmission medium.

In a transmission apparatus according to a third aspect, the second input/output terminal connects to a coupling electrode through an inductor and couples electrically to the transmission medium by series resonance of the inductor and capacitance formed between the coupling electrode and a surface of the transmission medium.

A transmission method according to a fourth aspect is a transmission method for transmitting a signal or electric power in a transmission system comprising a transmitter and a receiver, the transmitter comprising an output terminal for connecting to a first terminal line having an electrical length of substantially 90° and an output terminal for coupling electrically to a transmission medium comprising a conductor or a dielectric, the receiver comprising an input terminal for connecting to a second terminal line having an electrical length of substantially 90° and an input terminal for coupling electrically to the transmission medium, the transmission method comprising:
the transmitter supplying currents of the same magnitude and opposite sign from the two output terminals to the first terminal line and the transmission medium; and
the transmitter transmitting a high frequency signal or electric power to the receiver through the transmission medium.

A transmission system according to a fifth aspect comprises:

a transmitter comprising an output terminal for connecting to a first terminal line having an electrical length of substantially 90° and an output terminal for coupling electrically to a transmission medium comprising a conductor or a dielectric; and a receiver comprising an input terminal for connecting to a second terminal line having an electrical length of substantially 90° and an input terminal for coupling electrically to the transmission medium;

wherein the transmitter transmits a high frequency signal or electric power to the receiver through the transmission medium.

Advantageous Effect

With the transmission apparatus according to the first aspect, the transmission apparatus 10 transmits a high frequency signal or electric power when coupled to the transmission medium 50 and does not transmit when not coupled. Therefore, a highly stable transmission apparatus that is easy to design, has a simple configuration, and is not easily affected by the external environment can be provided.

With the transmission apparatus according to the second aspect, no high frequency signal or electric power is transmitted when the coupling electrode of the transceiver 30 that functions as a transmitter and the coupling electrode of the transceiver 30 that functions as a receiver do not come close to the transmission medium, whereas when the coupling electrode of the transceiver 30 that functions as a transmitter and the coupling electrode of the transceiver 30 that functions as a receiver come close to the transmission medium 50, a high frequency signal or electric power is transmitted through the transmission medium 50 from the transceiver 30 that functions as a transmitter to the transceiver 30 that functions as a receiver.

Since LC series resonance is generated with the transmission apparatus according to the third aspect, the output terminal 20b and the transmission medium 50 are coupled more strongly than when only being coupled by capacitive coupling without using LC series resonance. A high frequency signal or electric power can thus be transmitted efficiently.

With the transmission apparatus according to the fourth aspect, the transmission apparatus 10 transmits a high frequency signal or electric power when coupled to the transmission medium 50 and does not transmit when not coupled. Therefore, a highly stable transmission method that is easy to design, has a simple configuration, and is not easily affected by the external environment can be provided.

With the transmission system according to the fifth aspect, the transmission apparatus 10 transmits a high frequency signal or electric power when coupled to the transmission medium 50 and does not transmit when not coupled. Therefore, a highly stable transmission system that is easy to design, has a simple configuration, and is not easily affected by the external environment can be provided.

Other aims, features, and advantages of the present disclosure will become clear in the detailed description below, which is based on embodiments of the present disclosure and the attached drawings.

BRIEF DESCRIPTION OF THE DRAWINGS

In the accompanying drawings:

FIG. 6A, FIG. 6B, and FIG. 6C schematically illustrate various examples of the structure of the terminal line in FIG. 1;

FIG. 7 schematically illustrates operation of the high frequency transmission system in FIG. 1;

FIG. 8A and FIG. 8B illustrate a concrete example of a system using the high frequency transmission system in FIG. 1;

DETAILED DESCRIPTION

Figure 1:
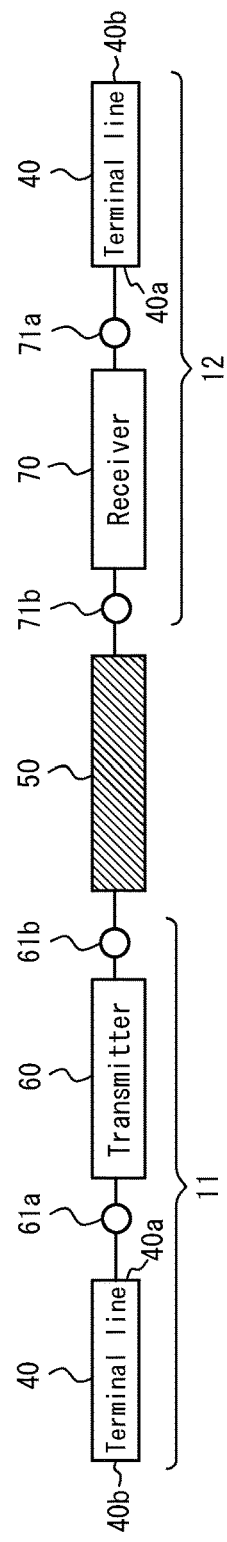
FIG. 1 is a functional block diagram illustrating the schematic configuration of a high frequency transmission system according to an embodiment of the present disclosure.

In a technique for transmitting high frequency signals or high frequency electric power in relation to the present disclosure, a differential signal or single ended signal is provided to two input/output terminals provided in a transmitter, receiver, or transceiver that constitutes a portion of a transmission path. One of the input/output terminals of the transmitter, receiver, or transceiver is connected to a transmission medium that acts as a medium for transmitting the high frequency signal or electric power. In the case of a differential signal, voltage of the same magnitude and opposite sign is applied to the two terminals of the transmitter, receiver, or transceiver, and current of the same magnitude flow in opposite directions through the two terminals. In the case of a single ended signal, signal voltage is applied to the one of the two terminals of the transmitter, receiver, or transceiver that is connected to a signal line, whereas the terminal connected to ground is at zero potential. As with a differential signal, current of the same magnitude flows in opposite directions through the two terminals of the transmitter, receiver, or transceiver.

Current that always has the same magnitude thus flows in opposite directions in the two input/output terminals for both a differential signal and a single ended signal. Hence, even if one terminal is connected to a transmission medium that constitutes a portion of the transmission path and the current is ready to be passed, current cannot flow through the transmission medium unless current also flows through the other terminal.

Therefore, whether current can flow to the transmission medium to transmit a high frequency signal or electric power through the transmission medium depends on whether current can be passed through the other terminal that is not connected to the transmission medium.

When the terminals of the transmitter and receiver that are not coupled to the transmission medium are connected to another transmission medium (i.e. when the two input/output terminals of the transmitter and the receiver are connected via two transmission media), current flows through both terminals of the transmitter and the receiver, and a high frequency signal or electric power can be transmitted. In this case, however, the transmitter and receiver need to be connected simultaneously by two lines, increasing the restrictions on design and decreasing usability.

Furthermore, when the terminals of the transmitter and the receiver that are not coupled to the transmission medium are coupled capacitively in space through coupling electrodes, positive and negative charges alternately build up on the coupling electrodes, and high frequency current flows through the terminals connected to the coupling electrodes. Current therefore flows through both of the terminals of the transmitter and the receiver, and a high frequency signal or electric power is transmitted. In this case, however, the capacitive coupling between the coupling electrodes is easily affected by the external environment, and surrounding metal or electromagnetic noise makes it difficult to perform communication stably.

Such methods to transmit a high frequency signal or electric power after constructing an overall closed circuit by connecting a transmitter and a receiver with two transmission media, or with one transmission medium and capacitive coupling in space via a set of coupling electrodes, need to establish two transmission paths simultaneously. In other words, in a high frequency transmission apparatus intended for intuitive operation whereby a high frequency signal or electric power is transmitted when the apparatus is coupled to a transmission medium and not transmitted when the apparatus is not coupled, two communication paths simultaneously need to be established stably at the time of communication. This requirement becomes a design constraint on the high frequency transmission apparatus and restricts the usage environment where communication is performed.

For example, in the case of a human body communication system that uses a human body as a communication medium to establish communication when an electrode is touched, the transmission efficiency of the second communication path for coupling through space is lower and more unstable than the first communication path that uses the human body as a transmission medium. Therefore, communication is affected by metal near the second communication path or by the imposition of electromagnetic noise, making stable communication difficult.

In an embodiment of the present disclosure described below with reference to the drawings, a high frequency signal or electric power is transmitted from a transmitter to a receiver over an open circuit formed by only one communication path through one transmission medium. This approach provides a transmission apparatus, a transmission method, and a transmission system that are easy to design, are highly stable, and are not easily affected by the external environment.

FIG. 1 is a functional block diagram illustrating the schematic configuration of a high frequency transmission system according to an embodiment of the present disclosure. As illustrated in FIG. 1, a high frequency transmission system 100 includes two high frequency transmission apparatuses 11 and 12. The high frequency transmission apparatuses 11 and 12 are connected electrically to a transmission medium 50. In the high frequency transmission system 100, one high frequency transmission apparatus 11 transmits a high frequency signal or electric power through the transmission medium 50, and the other high frequency transmission apparatus 12 receives the high frequency signal or electric power through the transmission medium 50. The high frequency transmission apparatus 11 on the transmitting side includes a transmitter 60, and the high frequency transmission apparatus 12 on the receiving side includes a receiver 70. Instead of the transmitter 60 or the receiver 70, the high frequency transmission apparatuses 11 and 12 may each include a transceiver that has both a transmitter function and a receiver function. In this case, by the transceiver performing either the transmitter function or the receiver function, the high frequency transmission apparatuses 11 and 12 can respectively perform transmission and reception operations. As illustrated in FIG. 1, the transmitter 60 includes output terminals 61a and 61b at either end, and the receiver 70 includes input terminals 71a and 71b at either end. Here, the transmitter, receiver, and transceiver correspond to the "communication device" of the present disclosure.

Figure 2:
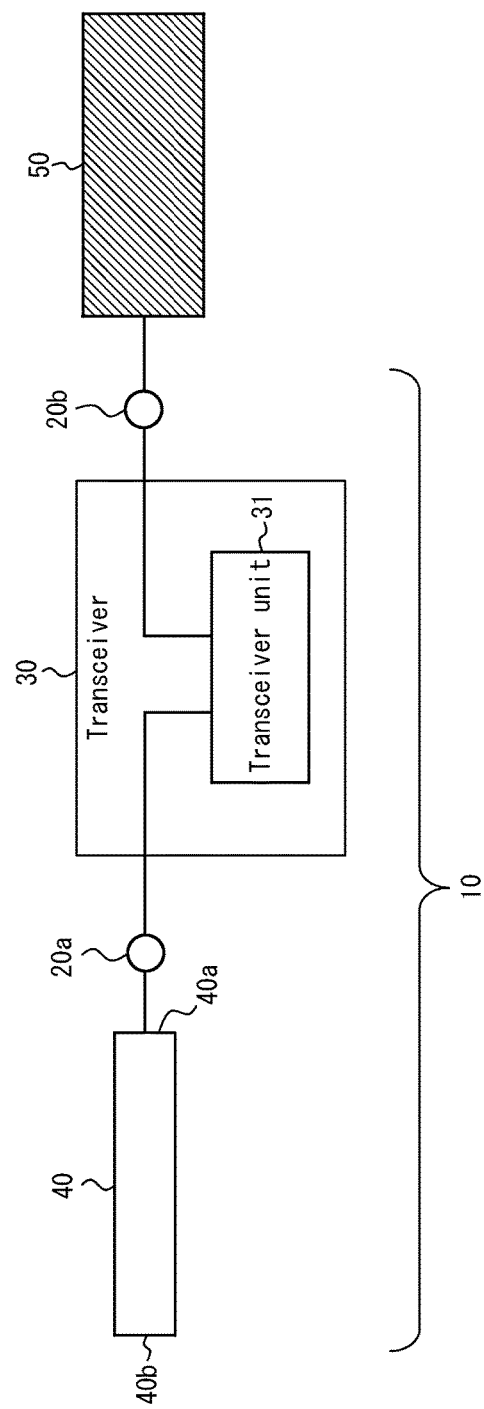
FIG. 2 is a functional block diagram illustrating the schematic configuration of a high frequency transmission apparatus in the high frequency transmission system of FIG. 1.

FIG. 2 is a functional block diagram illustrating the schematic configuration of a high frequency transmission apparatus in a high frequency transmission system. In FIG. 2, the high frequency transmission apparatuses 11 and 12 in FIG. 1 are collectively indicated as a high frequency transmission apparatus 10. Furthermore, in FIG. 2, the high frequency transmission apparatus 10 is illustrated as including a transceiver 30 that has a transmitter function and a receiver function. The input/output terminal 20a in FIG. 2 corresponds to the output terminal 61a and the input terminal 71a in FIG. 1, and the input/output terminal 20b in FIG. 2 corresponds to the output terminal 61b and the input terminal 71b in FIG. 1.

The high frequency transmission apparatus 10 includes the transceiver 30, which includes two input/output terminals 20a and 20b, and a terminal line 40. The input/output terminal 20a is connected to the terminal line 40, and the input/output terminal 20b is coupled electrically (hereinafter simply "coupled") to the transmission medium 50, which is formed by a conductor, such as metal, or a dielectric.

The transceiver 30 includes a transceiver unit 31 that controls transmission and reception operations in the transceiver 30. The transceiver 30 transmits a high frequency signal or electric power through the transmission medium 50 to another high frequency transmission apparatus 10 coupled to the transmission medium 50.

When the transceiver 30 functions as a transmitter, current flows to the terminal line 40 from the input/output terminal 20a of the transceiver 30 connected to the terminal line 40. At the same time, current of the same magnitude as the current flowing in the terminal line 40 flows in the opposite direction from the other input/output terminal 20b to the transmission medium 50, and the transceiver 30 transmits a high frequency signal or electric power to the transmission medium 50.

When the transceiver 30 functions as a receiver, current flows from the input/output terminal 20b coupled to the transmission medium 50 into the transceiver 30. At the same time, current of the same magnitude as the current flowing into the transceiver 30 flows in the opposite direction from the terminal line 40 to the other input/output terminal 20a, and the transceiver 30 receives a high frequency signal or electric power from the transmission medium 50.

The terminal line 40 has an electrical length of 90°. An electrical length of 90° means that the length of the line from the end 40a connected to the input/output terminal 20a to the other end 40b is one quarter of the wavelength of the high frequency signal to be transmitted. In other words, the phase of the high frequency signal to be transmitted advances 90° over the length from the end 40a connected to the input/output terminal 20a to the other end 40b.

Consequently, the current that flows to the terminal line 40 side from the end 40a, which is connected to the input/output terminal 20*a*, is subsequently reflected at the other end 40*b* of the terminal line 40 and returns to the end 40*a* connected to the input/output terminal 20*a*, thereby traversing a distance of half a wavelength. The phase thus advances 180°.

At this time, the input/output terminal 20*a* connected to the terminal line 40 can be considered a short-circuit terminal that is virtually connected to ground, and current flows from the input/output terminal 20*a* to the terminal line 40. Details are provided below with reference to FIG. 4.

The transmission medium 50 becomes a medium that transmits a high frequency signal or electric power between transceivers 30. The transmission medium 50 is configured to include a conductor, a dielectric, or a combination of a conductor and a dielectric. An example of a method for coupling the high frequency transmission apparatus 10 and the transmission medium 50 is described with reference to FIG. 3A, FIG. 3B, and FIG. 3C.

Figure 3A:
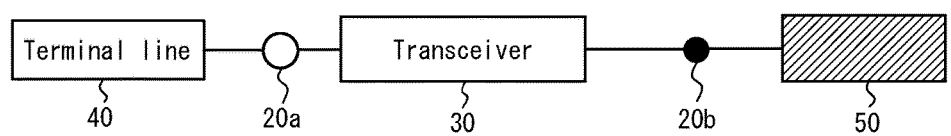
FIG. 3A, FIG. 3B, and FIG. 3C schematically illustrate an example of a coupling method between the high frequency transmission apparatus and a transmission medium.

In the case of the transmission medium 50 being a conductor, for example as illustrated in FIG. 3A, coupling of the transmission medium 50 and the input/output terminal 20*b* of the transceiver 30 is achieved by the input/output terminal 20*b* touching the transmission medium 50 for conduction. In this case, the input/output terminal 20*b* of the transceiver 30 that has the function of a transmitter (i.e. the output terminal 61*b* of the transmitter 60) and the input/output terminal 20*b* of the transceiver 30 that has the function of a receiver (i.e. the input terminal 71*b* of the receiver 70) do not transmit a high frequency signal or electric power when not touching the transmission medium 50. When the input/output terminal 20*b* of the transceiver 30 that has the function of a transmitter (i.e. the output terminal 61*b* of the transmitter 60) and the input/output terminal 20*b* of the transceiver 30 that has the function of a receiver (i.e. the input terminal 71*b* of the receiver 70) touch the transmission medium 50, a high frequency signal or electric power is transmitted through the transmission medium 50 from the transceiver 30 that has the function of a transmitter to the transceiver 30 that has the function of a receiver.

Figure 3B:
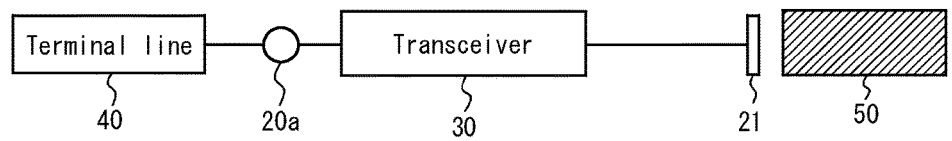

When the transmission medium 50 is a conductor or a dielectric, then coupling between the transmission medium 50 and the input/output terminal 20*b* of the transceiver 30 may, for example as illustrated in FIG. 3B, be achieved by providing a coupling electrode 21 on the input/output terminal 20*b* of the transceiver 30 and having the coupling electrode 21 and the surface of the transmission medium 50 undergo capacitive coupling when the coupling electrode 21 and the transmission medium 50 come close to each other. In this case, no high frequency signal or electric power is transmitted when the coupling electrode 21 of the transceiver 30 that functions as a transmitter and the coupling electrode 21 of the transceiver 30 that functions as a receiver do not come close to the transmission medium 50. Conversely, when the coupling electrode 21 of the transceiver 30 that functions as a transmitter and the coupling electrode 21 of the transceiver 30 that functions as a receiver come close to the transmission medium 50, a high frequency signal or electric power is transmitted through the transmission medium 50 from the transceiver 30 that functions as a transmitter to the transceiver 30 that functions as a receiver.

Figure 3C:
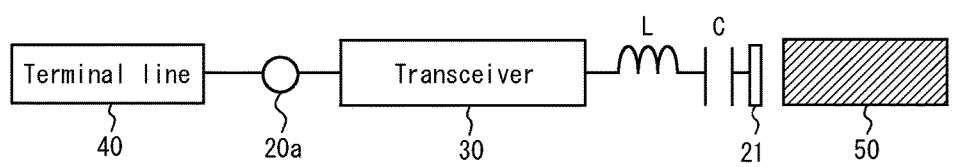

When the transmission medium 50 is a conductor or a dielectric, and coupling between the transmission medium 50 and the input/output terminal 20*b* of the transceiver 30 is achieved by capacitive coupling between the surface of the transmission medium 50 and a coupling electrode 21 provided on the input/output terminal 20*b* of the transceiver 30, then as illustrated in FIG. 3C, a coil may be further provided between the coupling electrode 21 and the input/output terminal 20*b* of the transceiver 30. In this case, LC series resonance is generated by the inductance (L) of the coil and the capacitance (C) between the coupling electrode 21 and the surface of the transmission medium 50.

The values of the inductance L and the capacitance C satisfy Expression (1) below when generating LC series resonance, where f is the frequency of the high frequency signal or electric power to be transmitted.

$$2\pi f = \frac{1}{\sqrt{LC}} \quad (1)$$

In this case, no high frequency signal or electric power is transmitted when the coupling electrode 21 of the transceiver 30 that functions as a transmitter and the coupling electrode 21 of the transceiver 30 that functions as a receiver do not come close to the transmission medium 50. Conversely, when the coupling electrode 21 of the transceiver 30 that functions as a transmitter and the coupling electrode 21 of the transceiver 30 that functions as a receiver come close to the transmission medium 50, a high frequency signal or electric power is transmitted through the transmission medium 50 from the transceiver 30 that functions as a transmitter to the transceiver 30 that functions as a receiver. When generating LC series resonance at this time, the output terminal 20*b* and the transmission medium 50 are coupled more strongly than when only being coupled by capacitive coupling without using LC series resonance. A high frequency signal or electric power can thus be transmitted efficiently.

The mechanism behind operation of the high frequency transmission apparatus 10 in the present embodiment is now described.

Figure 4:
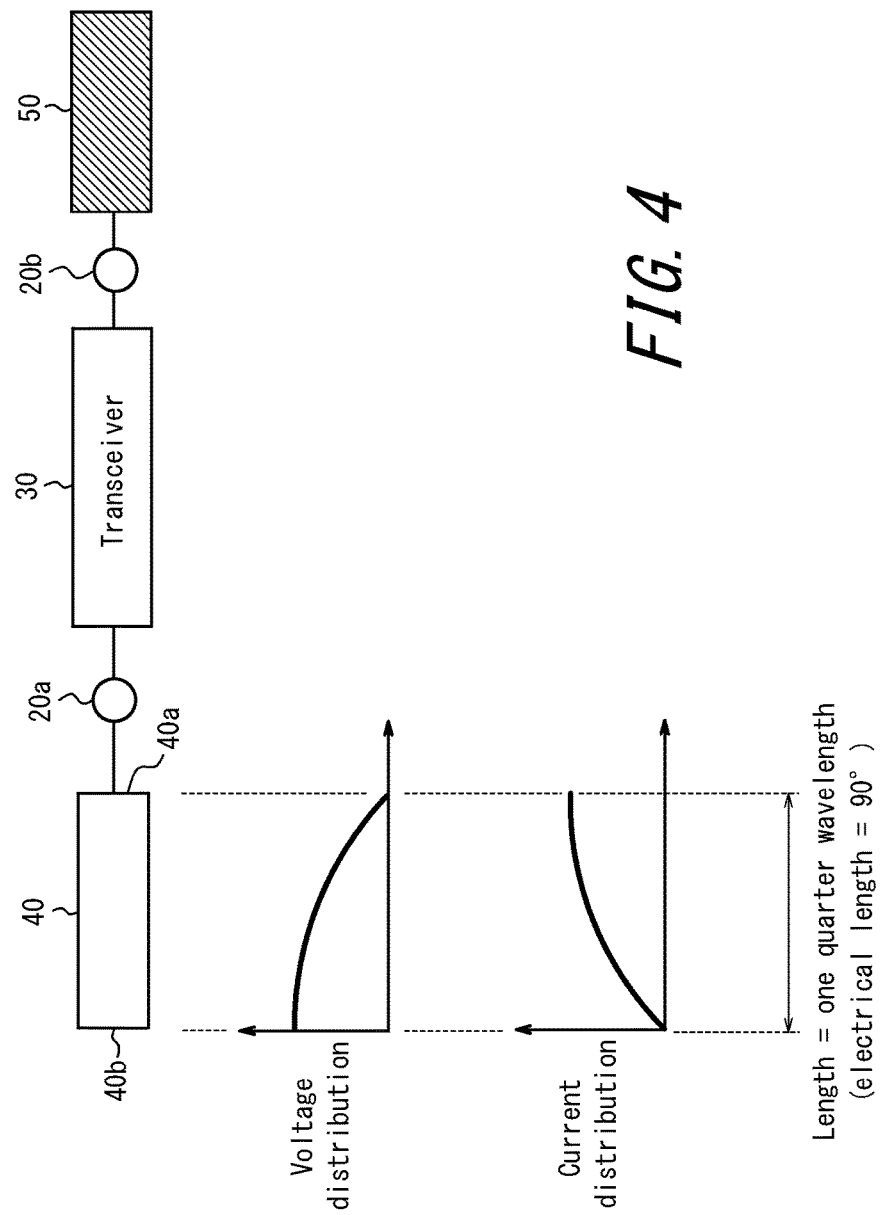
FIG. 4 schematically illustrates the mechanism behind operation of the terminal line in FIG. 1.

As illustrated in FIG. 4, the transceiver 30 inputs a high frequency signal to the terminal line 40, which has an electrical length of 90°, i.e. one quarter of the wavelength of the high frequency signal to be transmitted, and the end 40*b* of which is open. A standing wave is then generated in the terminal line 40, with maximum voltage amplitude and zero current amplitude at the end 40*b* and zero voltage amplitude and maximum current amplitude at the end 40*a*, and current flows to the end 40*a*. Whereas the voltage amplitude at the end 40*a* is zero at this time, current flows. Hence, as illustrated schematically in FIG. 5, the end 40*a* behaves as though it were virtually short circuited to ground.

As illustrated in FIG. 4, the current that flows into the output terminal 61*a* and the input terminal 71*a* is maximized when the electrical length of the terminal line 40 is 90°, i.e. when the signal input from the end 40*a* of the terminal line 40 connected to the output terminal 61*a* of the transmitter 60 and the input terminal 71*a* of the receiver 70 is reflected at the other end 40*b* and returns so that the phase of the reflected wave is 180°. Consequently, the high frequency transmission system 100 operates most effectively when the electrical length of the terminal line 40 is 90°. However, a certain advantage in high frequency transmission is still obtained when the high frequency transmission system 100 operates with the electrical length of the terminal line 40 within a range of ±45° of 90°, i.e. with the phase of the reflected wave being in a range greater than 90° and smaller than 270°. It thus suffices for the terminal line 40 to have an electrical length of substantially 90°, which includes a range of ±45° from 90°.

Here, the structure of the terminal line 40 can be appropriately set in accordance with the frequency of the high frequency signal or electric power. For example, when the frequency for communicating the high frequency signal or electric power is 13.56 MHz, the wavelength is approximately 22 m, and the quarter wavelength exceeds 5 m. In this case, for example as illustrated in FIG. 6A, the terminal line 40 may be bent into a meander line structure or a helical structure. The physical length can thus be reduced while maintaining the electrical length of the terminal line 40 at 90°, and the size of the high frequency transmission apparatus 10 can be reduced. Similar effects can also be obtained by attaching a conductor with a large area to the end of the terminal line 40, as illustrated in FIG. 6B, to take advantage of the effect of capacity loading. Furthermore, the size can also be reduced by covering the terminal line 40, formed from a conductor, with a material that has a high dielectric constant (high dielectric constant material) 41, as illustrated in FIG. 6C, or forming the terminal line 40 from such high dielectric constant material 41 to take advantage of the effect of wavelength shortening.

Figure 5:
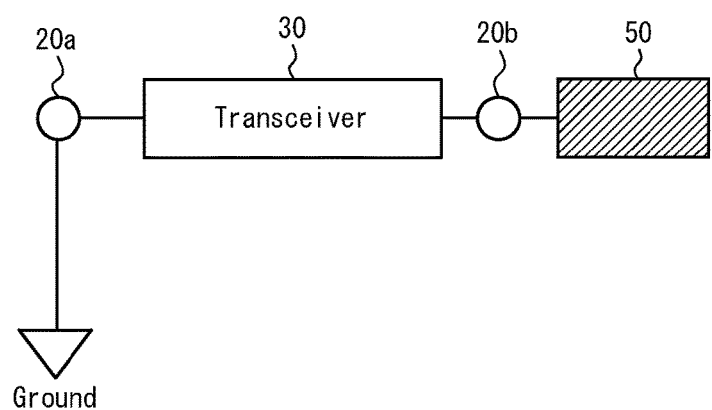
FIG. 5 schematically illustrates operation of the high frequency transmission apparatus in FIG. 4.

FIG. 7 illustrates the operations of the high frequency transmission apparatus 10 explained in FIG. 5 with reference to the high frequency transmission system 100 of FIG. 1. As illustrated in FIG. 7, the output terminal 61a of the transmitter 60 short circuits virtually to ground due to a terminal line 40 that has an electrical length of 90°, and the input terminal 71a of the receiver 70 short circuits virtually to ground due to another terminal line 40 that has an electrical length of 90°, as in the case described with reference to FIG. 5. By being coupled to the transmission medium 50, the output terminal 61b of the transmitter 60 and the input terminal 71b of the receiver 70 are connected through the transmission medium 50. Although the high frequency transmission system 100 is actually an open circuit formed by only one transmission path through one transmission medium 50, the system overall behaves as though it were a closed circuit through a virtual ground, thereby allowing a high frequency signal or electric power to be transmitted stably from the transmitter 60 to the receiver 70.

In this way, the high frequency transmission system 100 according to the present embodiment provided with a terminal circuit connected to the transmitter 60, the transmitter 60, the receiver 70, and a terminal circuit connected to the receiver can transmit a high frequency signal or electric power from the transmitter 60 to the receiver 70 through one transmission medium 50 over an open circuit formed by only one transmission path.

With this configuration, the high frequency transmission apparatus 10 transmits a high frequency signal or electric power when coupled to the transmission medium 50 and does not transmit when not coupled. Therefore, a highly stable high frequency transmission system that is easy to design, has a simple configuration, and is not easily affected by the external environment can be provided.

Next, an example of a concrete system using the high frequency transmission system 100 is described with reference to FIG. 8A and FIG. 8B.

The system 200 illustrated in FIG. 8A and FIG. 8B includes a high frequency transmission apparatus 13 provided with an identification (ID) circuit 62, which includes an IC chip with embedded ID information, and a high frequency transmission apparatus 14 provided with a reader circuit 72 that reads ID information. A terminal line 40 with an electrical length of substantially 90° is connected to one output terminal 61a of the ID circuit 62 and to one input terminal 71a of the reader circuit 72.

In FIG. 8A, the high frequency transmission apparatuses 13 and 14 are not connected, since the output terminal 61b of the ID circuit 62 is not connected to the transmission medium 50. In this state, the read signal output by the high frequency transmission apparatus 14 is not transmitted to the high frequency transmission apparatus 13, and no signal is transmitted between the high frequency transmission apparatuses 13 and 14.

In FIG. 8B, the high frequency transmission apparatuses 13 and 14 are connected, since the output terminal 61b of the ID circuit 62 is connected to the transmission medium 50. In this case, signals are transmitted between the high frequency transmission apparatuses 13 and 14, and a signal including ID information is transmitted from the high frequency transmission apparatus 13 to the high frequency transmission apparatus 14. In the high frequency transmission apparatus 14, the reader circuit 72 can read the signal that includes ID information. In this way, the reader circuit 72 of the high frequency transmission apparatus 14 can read the ID information, transmitted through the transmission medium 50, of the IC chip.

In the state in which the high frequency transmission apparatuses 13 and 14 are connected, as illustrated in FIG. 8B, the high frequency transmission apparatus 14 may also transmit electric power through the transmission medium 50 along with the read signal. In this case, the IC chip may operate on the basis of the electric power transmitted along with the read signal and overlay the IC information on the reflected wave of the transmitted signal. In this way, the reader circuit 72 can read the ID information of the IC chip included in the reflection that is transmitted through the transmission medium 50.

In FIGS. 8A and 8B, an example in which the ID circuit 62 and the reader circuit 72 are both connected to the terminal line 40 has been described, but the ID circuit 62 and the reader circuit 72 do not both necessarily have to be connected to the terminal line 40. Communication between the high frequency transmission apparatuses 13 and 14 can be established if one of the ID circuit 62 and the reader circuit 72 is connected to the terminal line 40 and the other is connected to ground.

Figure 9:
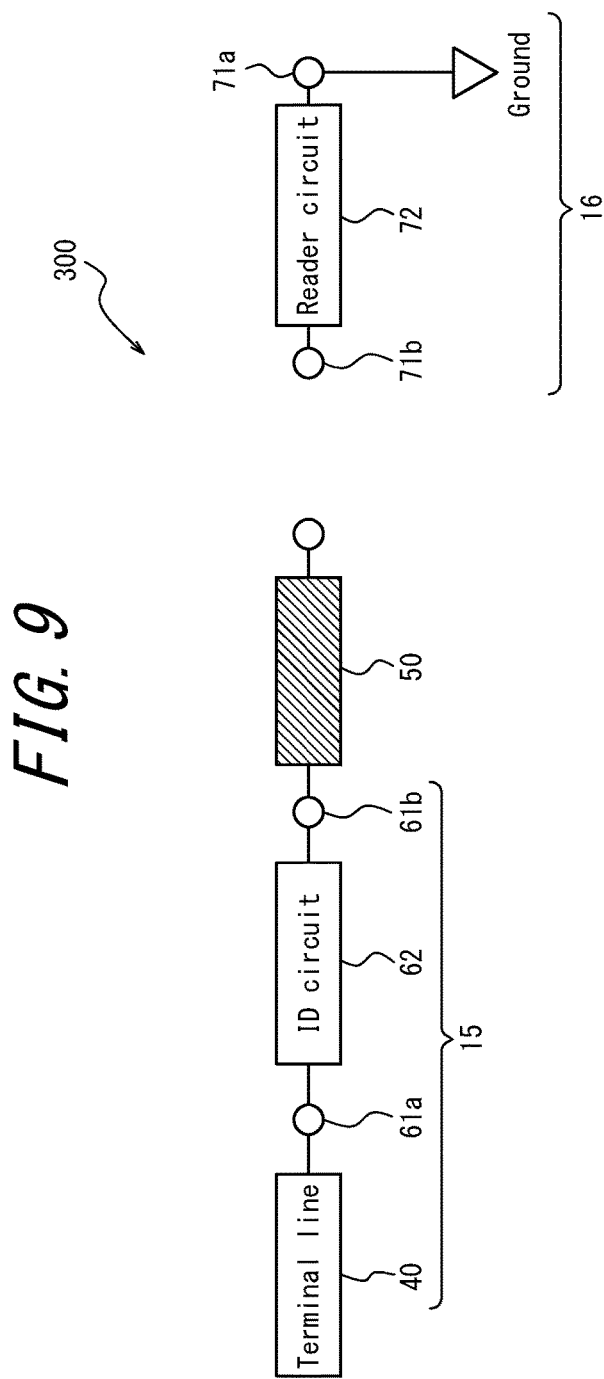
FIG. 9 illustrates another concrete example of a system using the high frequency transmission system in FIG. 1.

FIG. 9 illustrates another specific example of a system using the high frequency transmission system in FIG. 1. The system 300 illustrated in FIG. 9 includes a high frequency transmission apparatus 15 provided with an identification (ID) circuit 62, which includes an IC chip with embedded ID information, and a high frequency transmission apparatus 16 provided with a reader circuit 72 that reads ID information. A terminal line 40 with an electrical length of substantially 90° is connected to one output terminal 61a of the ID circuit 62. One input terminal 71a of the reader circuit 72 is connected to ground.

The high frequency transmission apparatuses 15 and 16 are connected once the input terminal 71b of the reader circuit 72 illustrated in FIG. 9 is connected to the transmission medium 50. In this case, the system 300 overall behaves as a closed circuit through the ground of the high frequency transmission apparatus 16 by the terminal line 40 of the high frequency transmission apparatus 15 functioning as a virtual ground. In this way, by the same principle as described above, communication is established between the high frequency transmission apparatuses 15 and 16.

The high frequency transmission system 100 can also be used as a human body communication system that uses a human body as a communication medium to establish communication when the human body touches an electrode. Configuring the high frequency transmission system 100 as a human body communication system allows use of the property that communication is possible even when the transmission medium 50 is provided in the high frequency transmission system 100 so as to surround the transceiver.

Figure 10:
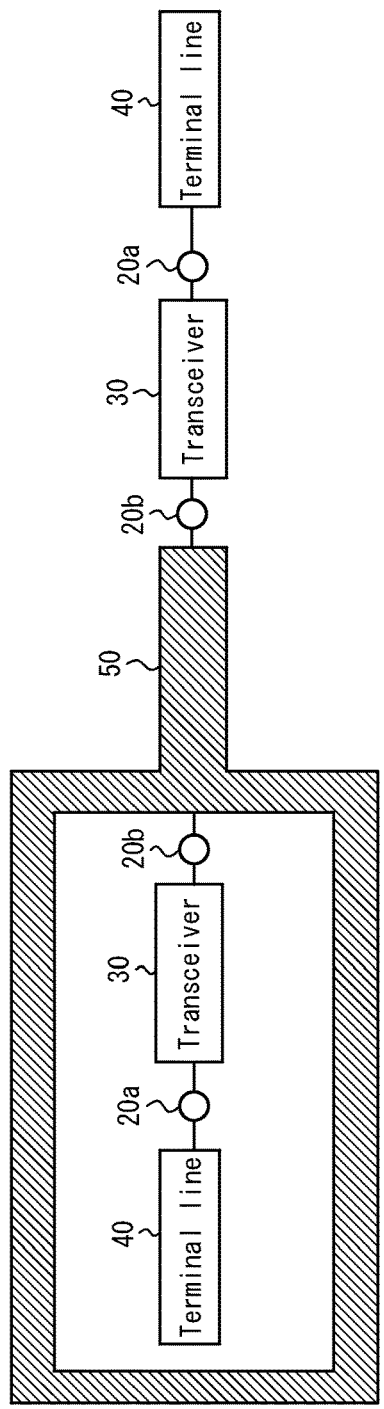
FIG. 10 schematically illustrates an example of a transceiver covered by a transmission medium in a high frequency transmission system.

In a human body communication system that uses a human body as a communication medium, another transmission path for coupling through space is necessary in addition to the transmission path that passes through the human body as a transmission medium. Consequently, the transmission path through space cannot be established if the transmitter or the receiver is held in the hand or the like, which prevents communication. However, if the transmitter and the receiver are connected by one transmission path in the high frequency transmission system 100 according to the present embodiment, communication is possible through a virtual ground, and a closed circuit need not be formed by a second transmission path. Therefore, in the high frequency transmission system 100, communication is possible even if the transmitter or the receiver is completely enclosed by a transmission medium such as a hand. In other words, for example as illustrated schematically in FIG. 10, the transceivers 30 in the high frequency transmission system 100 can transmit signals through the transmission medium 50 even if one transceiver 30 is covered by the transmission medium.

Consequently, the high frequency transmission apparatus 10 can, for example, be embedded in a medical capsule and swallowed. Having the human body that swallowed the medical capsule touch another high frequency transmission apparatus 10 allows communication between the inside and outside of the body, with the body as a communication medium.

Furthermore, by applying the high frequency transmission system 100 to a human body communication system that uses a human body as a transmission medium in this way, communication between high frequency transmission apparatuses 10 is established by touch, reducing the effect from nearby metal or from the imposition of electromagnetic noise. The high frequency transmission system 100 can thus provide a human body communication system that can achieve stable communication.

An embodiment of the present disclosure has been described in detail. A person of ordinary skill in the art, however, could make modifications or substitutions to the above embodiment without departing from the scope of the present disclosure. In other words, the present disclosure is not limited to the above embodiment, and a variety of modifications and changes are possible. For example, the functions and the like included in the various components may be reordered in any logically consistent way. Furthermore, components may be combined into one or divided.

The matter disclosed in the present disclosure is not intended to be all-encompassing. That is, the present disclosure does not deny the existence of subject matter not claimed in the present disclosure, i.e. the existence of subject matter of a later divisional application or subject matter to be added by amendment.

The present disclosure includes examples for the purpose of illustration but is not to be considered limited by the content of such examples.

REFERENCE SIGNS LIST 10, 11, 12, 13, 14, 15, 16 High frequency transmission apparatus
20a, 20b Input/output terminal
21 Coupling electrode
30 Transceiver
31 Transceiver unit
40 Terminal line
40a, 40b End
41 High dielectric constant material
50 Transmission medium
60 Transmitter
61a, 61b Output terminal
62 ID circuit
70 Receiver
71a, 71b Input terminal
72 Reader circuit
100 High frequency transmission system
200, 300 System

The invention claimed is:

1. A transmission apparatus comprising:
   a communication device comprising two input/output terminals; and
   a terminal line, connected to a first input/output terminal, having an electrical length of substantially 90°;
   wherein by a second input/output terminal electrically coupling with a transmission medium comprising a conductor or a dielectric, a high frequency signal or electric power is transmitted to another transmission apparatus coupled electrically to the transmission medium.

2. The transmission apparatus of claim 1, wherein the second input/output terminal connects to a coupling electrode and couples electrically to the transmission medium by capacitance formed between the coupling electrode and a surface of the transmission medium.

3. The transmission apparatus of claim 1, wherein the second input/output terminal connects to a coupling electrode through an inductor and couples electrically to the transmission medium by series resonance of the inductor and capacitance formed between the coupling electrode and a surface of the transmission medium.

4. A transmission method for transmitting a signal or electric power in a transmission system comprising a transmitter and a receiver, the transmitter comprising an output terminal for connecting to a first terminal line having an electrical length of substantially 90° and an output terminal for coupling electrically to a transmission medium comprising a conductor or a dielectric, the receiver comprising an input terminal for connecting to a second terminal line having an electrical length of substantially 90° and an input terminal for coupling electrically to the transmission medium, the transmission method comprising:
   the transmitter supplying currents of the same magnitude and opposite sign from the two output terminals to the first terminal line and the transmission medium; and
   the transmitter transmitting a high frequency signal or electric power to the receiver through the transmission medium.

5. A transmission system comprising:
   a transmitter comprising an output terminal for connecting to a first terminal line having an electrical length of substantially 90° and an output terminal for coupling electrically to a transmission medium comprising a conductor or a dielectric; and
   a receiver comprising an input terminal for connecting to a second terminal line having an electrical length of substantially 90° and an input terminal for coupling electrically to the transmission medium;

wherein the transmitter transmits a high frequency signal or electric power to the receiver through the transmission medium.

* * * * *